Oct. 4, 1966  JONG S. PUN  3,276,912

ELECTRIC DRY BATTERIES

Filed Jan. 9, 1964

Inventor
JONG SAU PUN
By Brown & Thomas
Attorneys

United States Patent Office 3,276,912
Patented Oct. 4, 1966

3,276,912
ELECTRIC DRY BATTERIES
Jong S. Pun, Kowloon, Hong Kong, assignor to Hing Wah Battery Factory (H.K.) Limited, Kowloon, Hong Kong, a company of Hong Kong
Filed Jan. 9, 1964, Ser. No. 336,656
Claims priority, application Great Britain, Jan. 22, 1963, 2,734/63
1 Claim. (Cl. 136—133)

This invention relates to electric dry batteries, and is particularly directed to the provision of batteries having improved means for preventing leakage therefrom or thereinto.

Batteries are known which include a first electrode in the form of a metallic cup which houses the electrolyte, and a second electrode formed by an elongate member arranged in the electrolyte within the said cup but insulated from the latter, the cup being surrounded by an outer metal jacket which is insulated from the cup by an intermediate sheath formed of one or more layers of paper, cardboard or similar material, closure means separate from said metal jacket being provided at least one end of the battery. Such batteries will hereinafter be referred to as being "of the kind described."

The said intermediate sheath usually protrudes beyond the ends of the said metal jacket at the ends of the battery and is generally used to provide a seal for the interior of the battery between one or both ends of the said jacket and the edge of the said separate closure means. It has been found, however, that the paper, cardboard or similar material which has been employed in the past to form such sheath does not provide an efficient seal as it is likely to rot or to become impregnated with moisture emanating from within the battery and/or from outside, with the result that leakage will occur and may cause short circuits to be set up so that the general efficiency and life of the battery is considerably decreased.

It is therefore an object of the present invention to provide a battery in which such disadvantages are nullified or considerably reduced.

Thus, according to the invention, there is provided an electric dry battery of the kind described, including at least one sealing member formed of a synthetic plastic material, such as polyethylene, and having at least a part thereof embracing and gripping the said closure means around its periphery while itself being gripped by the inturned end of the said metal jacket so as to provide a seal between the latter and the said closure means.

Thus, the or each said sealing member may, in the assembled battery, have at least a part thereof in the form of a ring of inwardly open U-shaped cross-section in which the periphery of the said closure means will be received and gripped.

The said closure means may conveniently constitute one of the terminals of the battery and may thus, for example, be in electrical contact with the base of the cup-shaped first electrode or that end of the aforementioned second electrode which extends out of the electrolyte adjacent the open end of the cup-shaped first electrode. The closure means may thus comprise a metal cap which fits over the said end of the second electrode and the periphery of which is engaged by said sealing member. The closure means could, however, be of annular, non-conducting form and be arranged to surround the said end of the second electrode, which in this case may or may not be provided with a separate terminal member.

Where the said closure means form one or both of the terminals of the battery, the sealing member or members also act to insulate the same from the said metal jacket; the efficiency of such insulation is, of course, of particular importance where both terminals of the battery are insulated from the jacket by respective sealing members, so as to prevent short circuiting.

In accordance with a further feature of the invention, the or each said sealing member may be formed with a flange arranged to extend between the said cup-shaped first electrode and the said metal jacket into contact with the said sheath so as further to increase the efficiency of the seal provided thereby.

Very conveniently, the said sealing member may, at the end of the battery adjacent the open end of the said cup-shaped second electrode, be so formed as to provide a seal for the whole of such open end and may thus, in accordance with another feature of the invention, extend inwardly to embrace the said second electrode. Such a sealing member may then have the form of an annulus shaped to provide the said seal between the outer jacket and the said closure means in the region of its outer periphery and sealingly to engage around the said second electrode at its inner periphery. In these circumstances, and where the second electrode is provided with a cap-like terminal plate as mentioned above, the sealing member may be provided with a further wedge-like flange at or adjacent its inner periphery which is arranged to be received between the second electrode and its said terminal.

Moreover, where, as in many known batteries, an asphalt sealing block is provided at the top surface of the electrolyte in the open end of the said cup-shaped electrode, a further flange or bead may be provided at or adjacent the inner periphery of the sealing member which engages the top surface of such block. Such an arrangement provides an advantageous balance of forces in the sealing member in that the downward pressure of the latter on the said sealing block has the effect of reinforcing the same.

Alternatively or in addition to the above described arrangements, a sealing member of the kind set forth may be provided at the end of the battery adjacent the base of the cup-shaped first electrode. Here again the said separate closure means may constitute a terminal plate for one of the electrodes, in this case the first electrode, with the base of which it will make contact. In these circumstances the sealing member may be formed simply as an annulus of inwardly open U-shaped cross-section to receive the periphery of the said closure means at that end of the battery; conveniently it will also be formed with a flange, of the kind mentioned previously, adapted to extend between the said outer jacket and the said cup-shaped first electrode into contact with said sheath.

In order that the invention may be more readily understood, one embodiment of the same will now be described by way of example and with reference to the accompanying drawings, in which.

Figure 1:
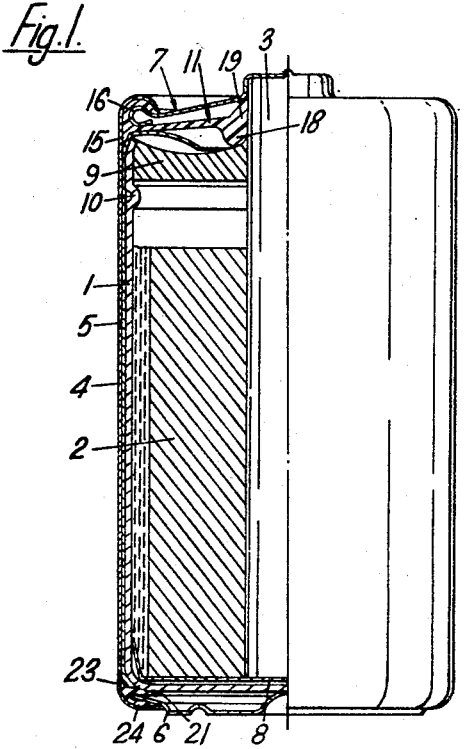
FIG. 1 is a side elevation, partly in medial cross-section, of a battery according to the invention.

Referring first to FIG. 1, the battery comprises a first electrode in the form of a zinc cup 1, containing electrolyte 2 in which a second electrode formed by a carbon rod 3 is positioned coaxially with the cup 1. The cup 1 is surrounded by an outer metal jacket 4, while an intermediate insulating sheath 5 formed by a number of layers of paper is situated between the cup and its metal jacket.

Figure 5:
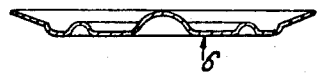

Closure means are provided at both ends of the battery and also constitute terminals therefor. A first terminal 6 (see also FIG. 5) makes contact with the base of the cup 1, while a second terminal 7 has the form of a cap which engages over the free end of the carbon rod 3.

At its lower end the second electrode 3 is insulated from the first electrode 1 by a tray 8 formed of non-conducting material.

The open end of the cup 1 is closed by an asphalt block 9 which rests on an annular bead 10 formed in the cup wall.

In accordance with the invention, two sealing members are provided to form seals between the metal jacket 4 and the terminals 7 and 8 at each end of the battery.

Figure 2:
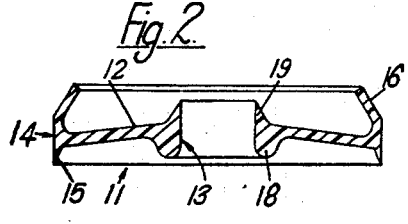
FIGS. 2 and 3 are medial cross-sections of sealing members before their assembly in the battery of FIG. 1.

At the upper end thereof, adjacent the open end of the cup 1, a sealing member 11 is provided. Before assembly in the battery, as may be seen from FIG. 2, the member 11 has the form of a disc 12 provided with inner and outer flanges or beads 13 and 14. Upon assembly, a skirt part 15 of flange 14 extends between the metal jacket 4 and the edge of the cup 1 into contact with the paper sheath 5, while the upper part 16 thereof is bent inwardly to embrace the outer periphery of the terminal cap 7 (which is turned over to form a bead 17 as shown) and is itself gripped by the inturned end of the jacket 4 so as to provide a tight and effective seal at the upper end of the battery.

The lower part 18 of the inner flange 13 of the sealing member is bead-shaped and, upon assembly, engages the top surface of the asphalt sealing block 9 to strengthen the same while, upon the terminal 7 being placed in position, the upper part 19 of the flange 13, which is wedge-shaped, engages between the terminal cap and the carbon rod 3.

Figure 3:
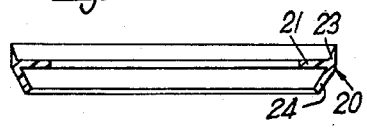
Figure 4:
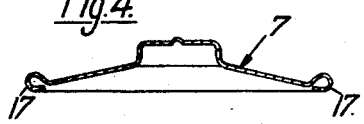
FIGS. 4 and 5 are medial cross-sections of closure means in the form of terminal plates for the ends of such battery.

At the lower end of the battery the sealing member 20 provided in accordance with the invention is formed, as shown in FIG. 3, as an annulus 21 having an upper skirt 23 and a lower flange 24. When assembled, the skirt 23 of flange 22 extends between the metal jacket 4 and the cup 1 into contact with the sheath 5 as does the flange part 15 of the other sealing member, while the lower part 24 of such flange co-operates with the annulus 21 to grip the periphery of terminal plate 6, while itself being gripped by the inturned end of the metal jacket 4 so that, here again, a tight and effective seal is provided between the jacket and the terminal plate. Engagement of the annulus 21 with the base of the zinc cup 1 also prevents moisture which may form on the walls of the cup from leaking past the sealing member 20.

Both of the sealing members 11 and 20 are formed of a suitably flexible synthetic plastic material so as to enable them to be deformed into the shapes which they have after assembly without any loss of their sealing efficiency.

I claim:

An electric dry battery including: an open-ended cup-shaped electrode with an electrolyte therein; a rod-shaped electrode extending centrally within said cup; an outer metal jacket surrounding the cup electrode and being insulated therefrom; a terminal plate at each end of the battery and in contact with the respective electrodes; and insulating sealing means at each end of the battery between the said terminal plates and the ends of the said metal jacket, said cup electrode being insulated from the said metal jacket by an intermediate paper sheath, said insulating sealing means comprising separate sealing members, one at each end of the battery, the sealing member at the open end of the cup electrode comprising an annular member surrounding and embracing said rod-shaped electrode and being formed at its external perimeter with a flange an outer part of which embraces the edge of the adjacent terminal plate between itself and the body of the sealing member and is itself embraced and gripped by an inturned end of the metal jacket, an inner part of said flange being received between the metal jacket and the said intermediate paper sheath, the internal perimeter of the said sealing member being formed with a further flange an outer part of which is received between the adjacent terminal plate and the outer end of the rod-shaped electrode, an inner part of said flange being of bulbous cross-section and resting on an annular asphalt sealing block seated in the mouth of the cup electrode, the other sealing member comprising an annular member having an outer flange embracing the edge of the adjacent terminal plate between itself and the body of the sealing member and is itself embraced and gripped by an inturned end of the metal jacket, and an inner flange which is received between the metal jacket and the said intermediate sheath.

References Cited by the Examiner

UNITED STATES PATENTS

| 2,457,810 | 1/1949 | Ellis | 136—133 |
| 2,642,471 | 6/1953 | Reinhardt et al. | 136—133 |
| 2,766,316 | 10/1956 | Stevens et al. | 136—133 |
| 3,068,312 | 12/1962 | Daley et al. | 136—133 |

FOREIGN PATENTS 214,993  5/1961  Austria.

WINSTON A. DOUGLAS, *Primary Examiner.*

D. L. WALTON, *Assistant Examiner.*